(12) United States Patent
Lakamp et al.

(10) Patent No.: US 7,203,965 B2
(45) Date of Patent: Apr. 10, 2007

(54) SYSTEM AND METHOD FOR HOME NETWORK CONTENT PROTECTION AND COPY MANAGEMENT

(75) Inventors: Brian Lakamp, Malibu, CA (US); Mitch Singer, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 813 days.

(21) Appl. No.: 10/403,993

(22) Filed: Mar. 31, 2003

(65) Prior Publication Data

US 2004/0117643 A1    Jun. 17, 2004

Related U.S. Application Data

(60) Provisional application No. 60/434,774, filed on Dec. 17, 2002.

(51) Int. Cl.
*H04L 9/00* (2006.01)
*H04N 7/167* (2006.01)

(52) U.S. Cl. .............................. 726/26; 726/27; 726/31; 380/201

(58) Field of Classification Search ........ 380/200–203, 380/217; 713/161, 163, 165, 167, 170, 176, 713/181; 726/26, 31, 27; 705/51, 57–59
See application file for complete search history.

(56) References Cited

U.S. PATENT DOCUMENTS

| | | | |
|---|---|---|---|
| 5,915,018 A | 6/1999 | Aucsmith | 380/4 |
| 6,052,780 A | 4/2000 | Glover | 713/193 |
| 6,104,677 A | 8/2000 | Kirihara et al. | 369/14 |
| 6,185,686 B1 | 2/2001 | Glover | 713/190 |
| 6,295,360 B1 | 9/2001 | Ryan et al. | 380/54 |

(Continued)

FOREIGN PATENT DOCUMENTS

WO    WO 99/60568    11/1999

(Continued)

OTHER PUBLICATIONS

DVB-: "Call for proposals for content protection & copy management technologies" DVB CPT REV 1.2, Jul. 5, 2001, XP002230687, www, Retrieved from the Internet: URL:http://www.cptwg.org/Assets/DVB-CPT-CfP_rev1.2.PDF 'retrieved on Feb. 10, 2003!, p. 1-p. 23.

(Continued)

*Primary Examiner*—Hosuk Song
(74) *Attorney, Agent, or Firm*—Samuel S. Lee; Procopio, Cory, Hargreaves & Savitch LLP

(57) ABSTRACT

A private home entertainment system including plural playback devices can receive discrete content that can be played by any appropriate publicly available devices. The home system can convert the discrete content to content that is bound to the private network using, e.g., cryptographic keys. The bound content can be freely copied and played among the devices in the private network but cannot be played outside the private network. Should the user elect to convert bound content back to discrete content to permit playing the content outside the network, all bound copies in the network are destroyed or otherwise rendered unusable.

14 Claims, 2 Drawing Sheets architecture

U.S. PATENT DOCUMENTS

| | | | |
|---|---|---|---|
| 6,310,956 B1 | 10/2001 | Morito et al. | 380/201 |
| 6,438,692 B2 | 8/2002 | Kato et al. | 713/176 |
| 6,530,021 B1 * | 3/2003 | Epstein et al. | 713/176 |
| 6,550,011 B1 * | 4/2003 | Sims, III | 713/193 |
| 6,802,003 B1 * | 10/2004 | Gross et al. | 713/175 |
| 6,986,048 B1 * | 1/2006 | Epstein et al. | 713/176 |
| 2001/0042043 A1 | 11/2001 | Shear et al. | 705/51 |
| 2001/0051928 A1 | 12/2001 | Brody | 705/52 |
| 2002/0003880 A1 | 1/2002 | Kato et al. | 380/201 |
| 2002/0016919 A1 | 2/2002 | Sims, III | 713/193 |
| 2002/0026636 A1 | 2/2002 | LaComte | |
| 2002/0041686 A1 | 4/2002 | Moriyama et al. | 380/201 |
| 2002/0046178 A1 | 4/2002 | Morito et al. | 705/51 |
| 2002/0107803 A1 | 8/2002 | Lisanke et al. | 705/51 |
| 2002/0126842 A1 | 9/2002 | Hollar | 380/201 |
| 2002/0141577 A1 | 10/2002 | Ripley et al. | 380/201 |

FOREIGN PATENT DOCUMENTS

| | | |
|---|---|---|
| WO | WO 00/62505 | 10/2000 |
| WO | WO 01/46786 | 6/2001 |
| WO | WO 01/75876 | 10/2001 |
| WO | WO 02/03211 | 1/2002 |
| WO | WO 03/039155 | 5/2003 |

OTHER PUBLICATIONS

IBM: "IBM Response to DVB-CPT Call for Proposals for Content Protection & Copy Management: XCP Cluster Protocol" Internet, Oct. 19, 2001, XP001148193, www, Retrieved from the Internet: <UPL:HTTP://WWW.ALMADEN.IBM.COM/SOFTWARE/DS/CONTENTASSURANCE/PAPERS/XCP_DVB.P>, p. 3-p. 32.

* cited by examiner

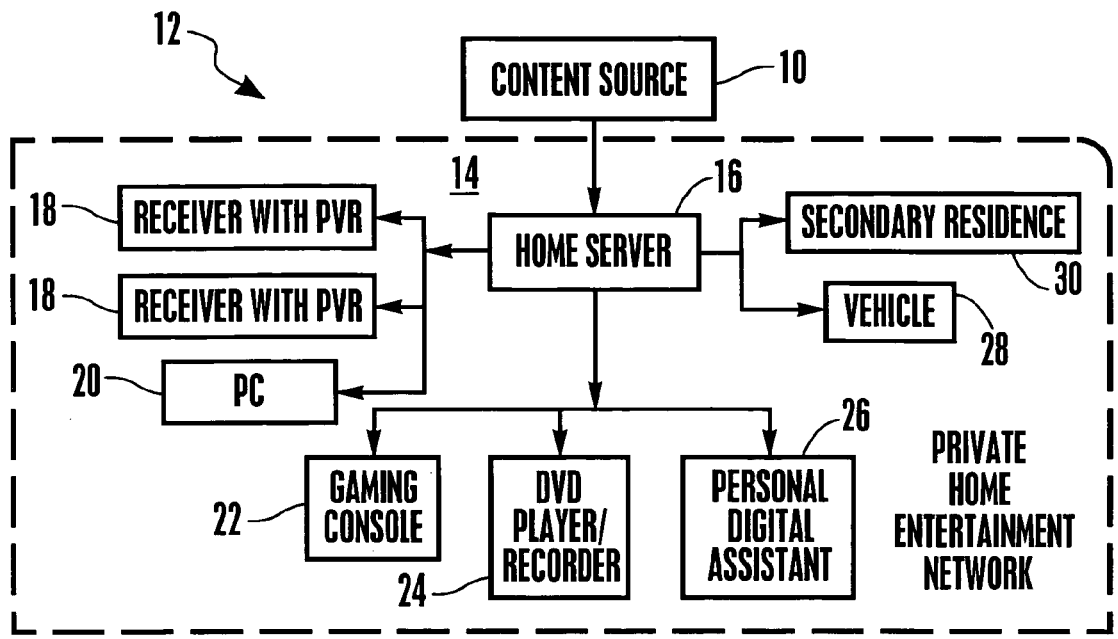
Fig. 1 - architecture
Fig. 2 - overall logic
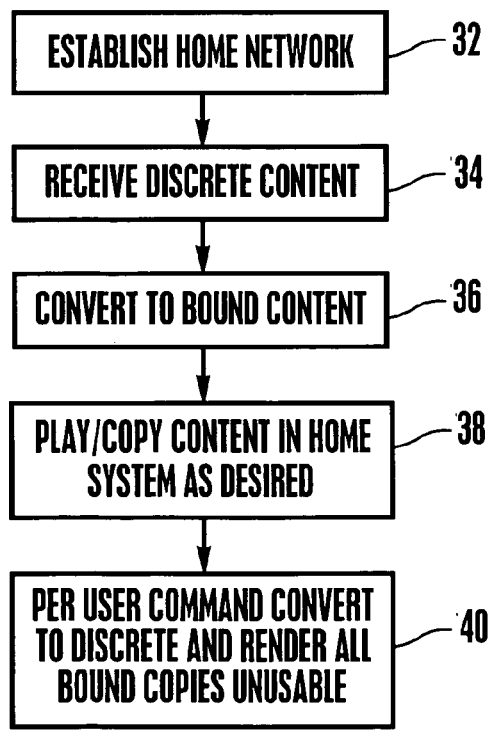

SYSTEM AND METHOD FOR HOME NETWORK CONTENT PROTECTION AND COPY MANAGEMENT

RELATED APPLICATIONS

This application claims priority from U.S. provisional application Ser. No. 60/434,774, filed Dec. 17, 2002, incorporated herein by reference.

FIELD OF THE INVENTION

The present invention relates generally to content protection and copy management.

BACKGROUND OF THE INVENTION

The advantages of digitized video and music are numerous, but one significant drawback is that being digitized, the content is relatively easy to copy perfectly, without authorization of the copyright owner. Copies can be made of digital audio and video content that is provided to in-home users on media such as digital versatile disks (DVDs). Indeed, widespread copying by pirates costs content owners billions of dollars per year. Thus, the present invention understands that it is desirable to limit the unauthorized copying of digital audio and video. Consequently, many copy guard schemes have-been introduced to prevent unauthorized copying of a vended CD or DVD.

The problem, however, is complicated by the desire of buyers of digitized content to make copies for personal uses. For example, a buyer of a DVD movie might have a home entertainment network that might include several DVD players, personal video recorders (PVRs), and other computing devices such as personal computers (PCs) and personal digital assistants (PDAs) on which the buyer might want to play, at various times, the purchased content. Under these circumstances, the buyer would prefer to access and copy the content over digital channels, rather than transport the purchased DVD to each device. Moreover, some of the network devices might not be configured for receiving a DVD or other media format on which the content was purchased. Assuming the appropriate controls can be established, content providers in general do not object to such copying, because it is merely a convenience for a buyer who has already purchased the content and desires to use it solely for his or her own personal enjoyment.

But as intimated above, if such functionality is permitted without constraints, unscrupulous purchasers could open their home networks to unauthorized users or make pirate copies of the content that they could then sell or give away, depriving copyright owners of compensation. The present invention has been provided with the above critical observations in mind.

SUMMARY OF THE INVENTION

A method for content protection in a private home entertainment network that has plural playback devices includes receiving discrete content from a content source. The discrete content is characterized by being playable in any playback devices that are compliant with such discrete format, including playback devices outside a particular private home entertainment network. The method then includes ingesting the discrete content into a particular private home entertainment network such that the discrete nature of the content is disabled and a "bound" version of the content exists on the private home network. Bound content is characterized by being playable only by playback devices that are legitimate members of the private home entertainment network.

Preferably, the method also includes permitting a user of the private home entertainment network to convert the bound content back to discrete content to allow the content to return to a network independent state. When this is done, the method renders unusable all copies of the corresponding bound content on the private home entertainment network by, e.g., deleting authority to access the content from the network. In a non-limiting embodiment, the discrete content is rendered into bound content by encrypting the discrete content using at least one key associated with the private home entertainment network.

In another aspect, a system for content protection in a home entertainment network that has plural playback devices includes means for receiving discrete content from a content source, and means for encrypting the content using at least one key associated with the home entertainment network to render bound content that is bound to the home entertainment network. Also, the system includes means for storing the bound content in the home entertainment network. Means are provided for making the bound content available to all network devices for playback thereon. Moreover, the system includes means for permitting a user to move the content onto a discrete media that is not bound to the network, and, if the user moves the content onto the discrete media, rendering unusable all bound copies of the content in the network.

In yet another aspect, a home entertainment system includes plural playback devices communicating in a private network. A processor executes logic for permitting a user to play discrete content on any playback device but not to make copies of the content. The logic also permits a user to convert discrete content to bound content and to make at least N copies of the bound content, wherein $N \geq 1$. In this aspect, discrete content is characterized by being playable by authorized devices inside and outside the private network, and bound content is characterized by being playable only by the playback devices inside the network.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present home entertainment system architecture;

FIG. 2 is a flow chart of the overall logic of the invention; and

DETAILED DESCRIPTION OF THE PREFERRED EMBODIMENT

Figure 3:
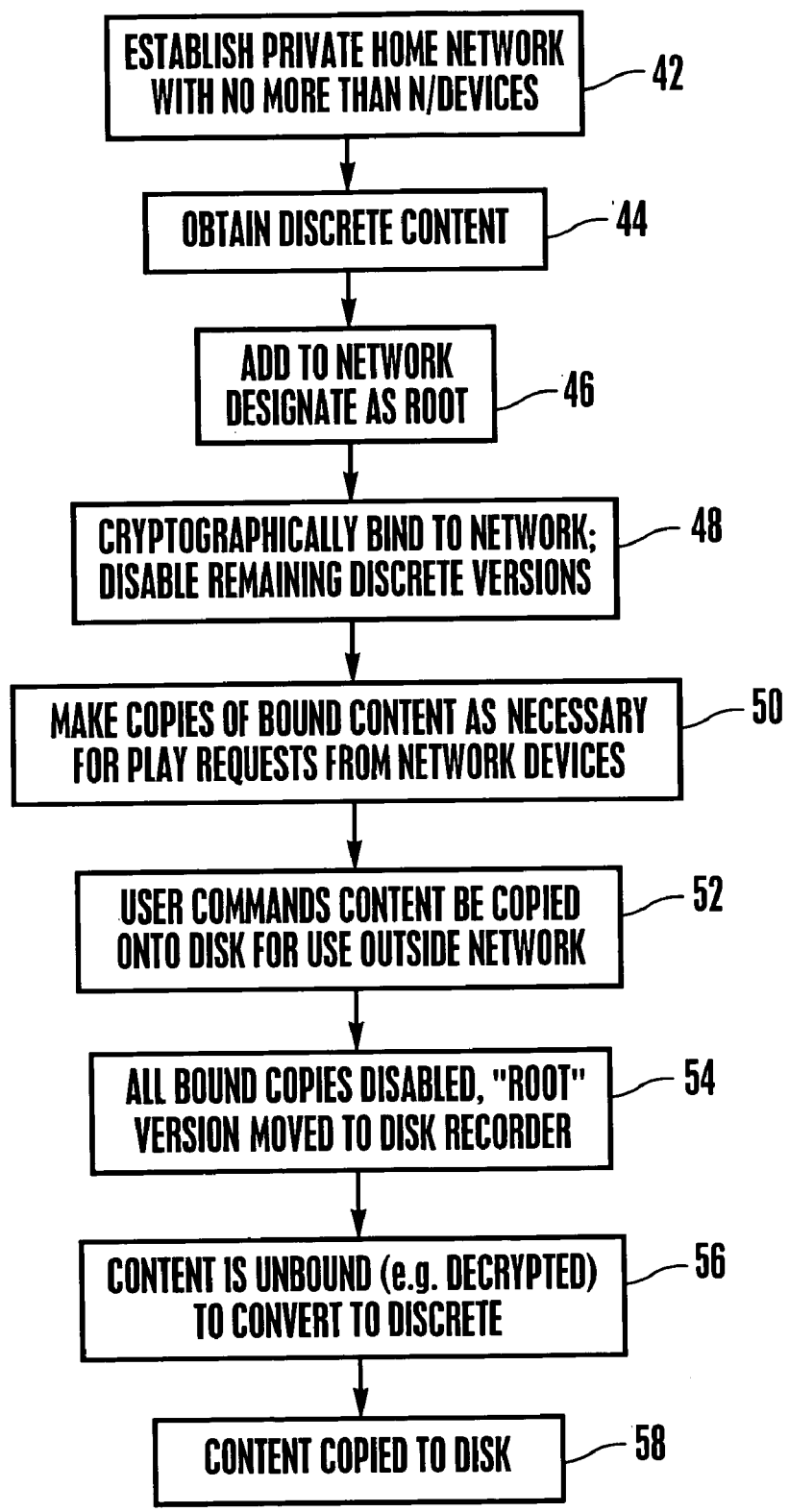
FIG. 3 is a flow chart of a preferred implementation of the present logic.

Referring initially to FIG. 1, one or more content sources 10 provide content to a private home entertainment network, generally designated 12, such that the content may be freely copied at least "N" times, wherein $N \geq 1$, and played within the network 12 but cannot be copied for conveying the content outside of the network 12 unless the network 12 no longer has access to the content. The content is delivered via a delivery path 14, which could be satellite, terrestrial, or Internet broadband (such as DirectTV™ or MovieLink™), point-to-point, or transport as compliant discrete media or other removable memory device that is compliant with the principles discussed herein.

As received, the content generally is in a "discrete" state. As used herein, discrete content is network independent, may be moved (but not copied) between networks and users, and may be shifted, if authorized, to the bound state as long as the discrete version of the content is no longer network independent. "Bound" content or media, on the other hand, is cryptographically or otherwise tied to one and only one private home entertainment network such that it can be played only by devices in that network. Bound content can be copied within the network, including to physical media if the content remains bound to the network, and it can be shifted to the discrete state upon authorization, at which point effectively all network copies of the bound content are rendered unusable. Compliant network devices cannot, however, transfer bound content in usable state outside the network.

FIG. 1 shows that the network 12 can include plural network devices that are linked by wired or wireless network pathways. By "network device" is meant a component of the network 12 that is logically bound to other home network devices such that bound content on one device can be freely copied or moved to or viewed on another device in the network.

More particularly, FIG. 1 shows that the network 12 can include a home computer server 16 that functions in accordance with the logic disclosed herein. If desired, the functions of the server 16 can be distributed to one or more of the other network devices shown in FIG. 1. The server 16 can be any appropriate processing apparatus.

Several network devices are shown communicating with the server 16. For example, one or more receivers 18 with associated personal video recorders (PVR) can communicate with the server 16, as can one or more personal computers (PC) 20. Also, the network 12 can include one or more gaming consoles 22, as well as one or more digital video disk (DVD) player/recorders 24. One or more portable personal digital assistants (PDA) 26 and vehicle or vehicles 28 can be members of the network 12, subject to the constraints mentioned below. A secondary residence 30 containing further network devices can also be part of the network 12.

The network 12 is private in that non-network devices cannot access bound content on the network 12. Accordingly, the network 12 can be physically separate from public networks, or it can be a virtual private network that uses public network resources but that cannot be accessed by non-networked devices in accordance with VPN principles known in the art.

Now referring to FIG. 2, the overall logic of the invention can be seen. Commencing at block 32, the network 12 is established. The devices of the network 12 are authenticated using authentication principles known in the art and upon successful authentication, are made members of the network. Upon being granted membership and periodically thereafter, a device is provided, among other things, with any keys that might be necessary for playing bound content. For instance, all devices on the network might share the same private key of a public key/private key pair, or use some other cryptographic principle if desired. If desired, each network device may also have its own unique keys.

In the preferred embodiment, the number of authorized devices is limited to a predetermined number, e.g., fifteen (15), to limit the risk that the network will be compromised. Display-only devices in the network 12 might not be counted against this number.

Portable network devices such as the PDA 26 can remain participating members of the network 12, accessing it wirelessly if desired, as long as the device is not explicitly disconnected from the network by the user and as long as it checks in with the server 16 within a predetermined time interval. Otherwise, the device will be considered disconnected and its keys timed out. Upon being disconnected from the network 12, any copies of bound content in the device are rendered unusable by, e.g., ensuring only compliant devices are authenticated at block 32 and thus are programmed to delete or erase or otherwise render unusable bound content upon network disconnection. Keys may be refreshed from time to time and upon predetermined events (such as the disconnection of a device or to render previously bound content unusable).

Proceeding to block 34, discrete content is received by the network 12 (e.g., by the server 16) as described above, and then is converted to bound content at block 36. As one non-limiting example, the discrete content may be encrypted using the keys of the network 12 such that only network devices having the keys can decrypt (and, hence, play) the content. Once converted to the bound state, no usable version of the discrete content remains. Any copies that exist are deleted or erased or otherwise rendered unusable. Thus, for example, when discrete content is to be initially received on a disk, the disk must facilitate alteration such that no discrete content remains on the disk or if it remains, it is either modified to be bound content or is rendered unusable by non-network devices.

If desired, when discrete content is received on a disk and then converted to bound, the disk may be visually marked to indicate the bound state using the marking principles set forth in U.S. Pat. No. 6,104,677, owned by the present assignee and incorporated herein by reference. Likewise, the disk may be marked to indicate a change back to the discrete state using the principles set forth further below.

Block 38 indicates that the bound content can be moved around and/or copied within the network 12, including on compliant physical media, as desired to play it on whatever network device the user chooses.

When bound content moves through the network, it preferably moves securely, in accordance with secure data movement principles known in the art. The device requesting the bound content may, e.g., decrypt the content during playing but not maintain any non-bound copy of the content. The content can move using network connections, or using portable network devices, or using distinct physical media such as Sony's Memory Stick® that is bound (or whose content is bound) to the network.

At block 40, a user may decide to unbind the content from the network 12. To do this, one bound copy is converted by, e.g., decrypting the content, and re-encrypting in the newly discrete state and then copied to, e.g., a portable disk or transmitted outside the network. All bound copies of the content in the network 12 are rendered unusable by deletion, erasure, or other mode such as preventing access to it.

FIG. 3 illustrates a specific non-limiting implementation of the overall logic discussed above. Commencing at block 42, the private network is established in accordance with principles discussed above, preferably with no more than a predetermined number "M" of devices. At block 44, discrete content is obtained and at block 46 is added to the network (and more specifically to storage controlled by the server 16), designating a "root" copy of the bound content either before or after the next step.

At block 48, the root copy is cryptographically bound to the network 12 as disclosed above. The remaining discrete version of the content is disabled or otherwise rendered unusable. Moving to block 50, copies of the bound root version are made as necessary to support play requests from the network devices shown in FIG. 1.

Block 52 indicates that should a user desire to provide, to a destination which is outside the network 12, content that is bound to the network 12 using, e.g., a disk, the user can so command. In response, at block 54 all bound copies are disabled from viewing, and the root version is moved or designated to be the version on the disk recorder. At block 56 the content is unbound in accordance with the above principles to convert it to the discrete state, and then copied at block 58 to, e.g., a disk that can be transported outside the network 12. All remaining bound copies including the root version are rendered unusable by devices on the network 12.

To give but two examples of how the above invention might be used, a user might download a 72 hour rental program from a content source, with the content being bound to the network upon arrival. Any network device can view the content during the rental period, but once the viewing period elapses, all copies are rendered unusable by, e.g., rendering unusable all copies from the network.

As another example, assume that discrete content is purchased and is downloaded to fixed or removable media within the network 12 (e.g., within the server 16). Once bound upon user command or automatically or otherwise, the content may be accessed and copied as necessary by any network device. If the user elects to maintain the content in its discrete state, no copying is permitted, but the content may be moved by, e.g., placing the content on a removable media and transporting the memory device from network device to network device for sequential playing as desired by the user.

While the particular SYSTEM AND METHOD FOR HOME NETWORK CONTENT PROTECTION AND COPY MANAGEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconciliable with the present specification and file history.

What is claimed is:

1. A system for content protection in a home entertainment network having plural playback devices, comprising:
    means for receiving content from a content source;
    means for encrypting the content using at least one key associated with the home entertainment network to render bound content that is bound to the home entertainment network;
    means for storing the bound content in the home entertainment network;
    means for making the bound content available to at least one device of the network for playback thereon;
    means for permitting a user to transform the content into discrete content that is not bound to the network; and
    means for, if the user transforms the content into a discrete state, rendering unusable all bound copies of the content in the network.

2. The system of claim 1, wherein the content source is at least one of: a broadcast content source, a broadband source, or a physical media source.

3. The system of claim 1, wherein at least the means for encrypting, storing, making available, permitting, and rendering unusable includes logic executable by at least one processor.

4. The system of claim 1, wherein the content received from the content source is discrete content characterized by being playable at least by playback devices other than the playback devices in the home entertainment network.

5. The system of claim 1, wherein the bound content is characterized by being playable only by playback devices in the private home entertainment network, the bound content being freely copyable at least N times within the home entertainment network, wherein $N \geq 1$.

6. The system of claim 1, wherein the bound content is rendered unusable by deleting the content from the network.

7. The system of claim 1, wherein the bound content is rendered unusable by revoking a license to the content.

8. The system of claim 1, wherein the content source is a disk, and the disk is visually marked to indicate whether it holds discrete or bound content.

9. A home entertainment system, comprising:
    plural playback devices communicating in a private network; and
    at least one processor executing logic for:
    permitting a user to play discrete content on any playback device but not to make a copy of the content, and
    permitting a user to convert discrete content to bound content and to make at least N copies of the bound content, wherein $N \geq 1$, wherein
    discrete content is characterized by being playable by authorized devices outside the private network, and bound content is characterized by being playable only by the playback devices in the network.

10. The system of claim 9, wherein the logic executed by the processor further comprises:
    permitting a user of the private home entertainment network to convert the bound content back to discrete content, and
    if the user so converts the bound content, rendering unusable all copies of the bound content.

11. The system of claim 9, wherein the bound content is rendered unusable by deleting the content or a key or license associated therewith from the network.

12. The system of claim 9, wherein discrete content is received on a disk, and the disk is visually marked to indicate whether it holds discrete or bound content.

13. The system of claim 9, wherein the discrete content is rendered into bound content by encrypting the discrete content using at least one key associated with the private home entertainment network.

14. The system of claim 10, wherein the logic executed by the processor includes designating a root version of bound content from which copies of the bound content can be made within the network, bound content being rendered unusable if the bound content is transformed back to discrete content.

* * * * *